United States Patent [19]
Johnson

[11] Patent Number: 4,561,157
[45] Date of Patent: Dec. 31, 1985

[54] METHOD FOR FORMING ROLLER RETAINERS IN A BEARING CAGE

[75] Inventor: Paul H. Johnson, Jamestown, N.Y.

[73] Assignee: TRW Inc., Cleveland, Ohio

[21] Appl. No.: 370,695

[22] Filed: Apr. 22, 1982

[51] Int. Cl.$^4$ ............................................. B21C 37/30
[52] U.S. Cl. ........................... 29/148.4 A; 29/148.4 C; 29/437; 29/725; 384/572
[58] Field of Search .................... 29/148.4 A, 148.4 C, 29/437, 515, 240, 725; 308/217; 72/313, 314; 83/556, 558, 697

[56] References Cited

U.S. PATENT DOCUMENTS 2,881,646  4/1959  Farr et al. ................. 29/148.4 A X
3,494,684  2/1970  Benson ....................... 29/148.4 C X

FOREIGN PATENT DOCUMENTS 973310  7/1949  Fed. Rep. of Germany ...... 308/217

Primary Examiner—Howard N. Goldberg
Assistant Examiner—Joseph M. Gorski

[57] ABSTRACT

Method for forming roller bearing cage lugs into roller retainers. Portions of the lugs provided on bearing cage webs are staked to a preselected depth and a desired retainer conformation in an overlying relationship with adjacent roller receiving pockets in the cage. A punch assembly which accommodates a pair of simultaneous staking operations is employed. The assembly includes a staking punch configured to stake portions of the same lug in opposite directions from each other overlying portions of adjacent receiving pockets or to stake portions of adjacent lugs in opposite directions toward each other overlying opposed sides of the same receiving pocket.

8 Claims, 9 Drawing Figures

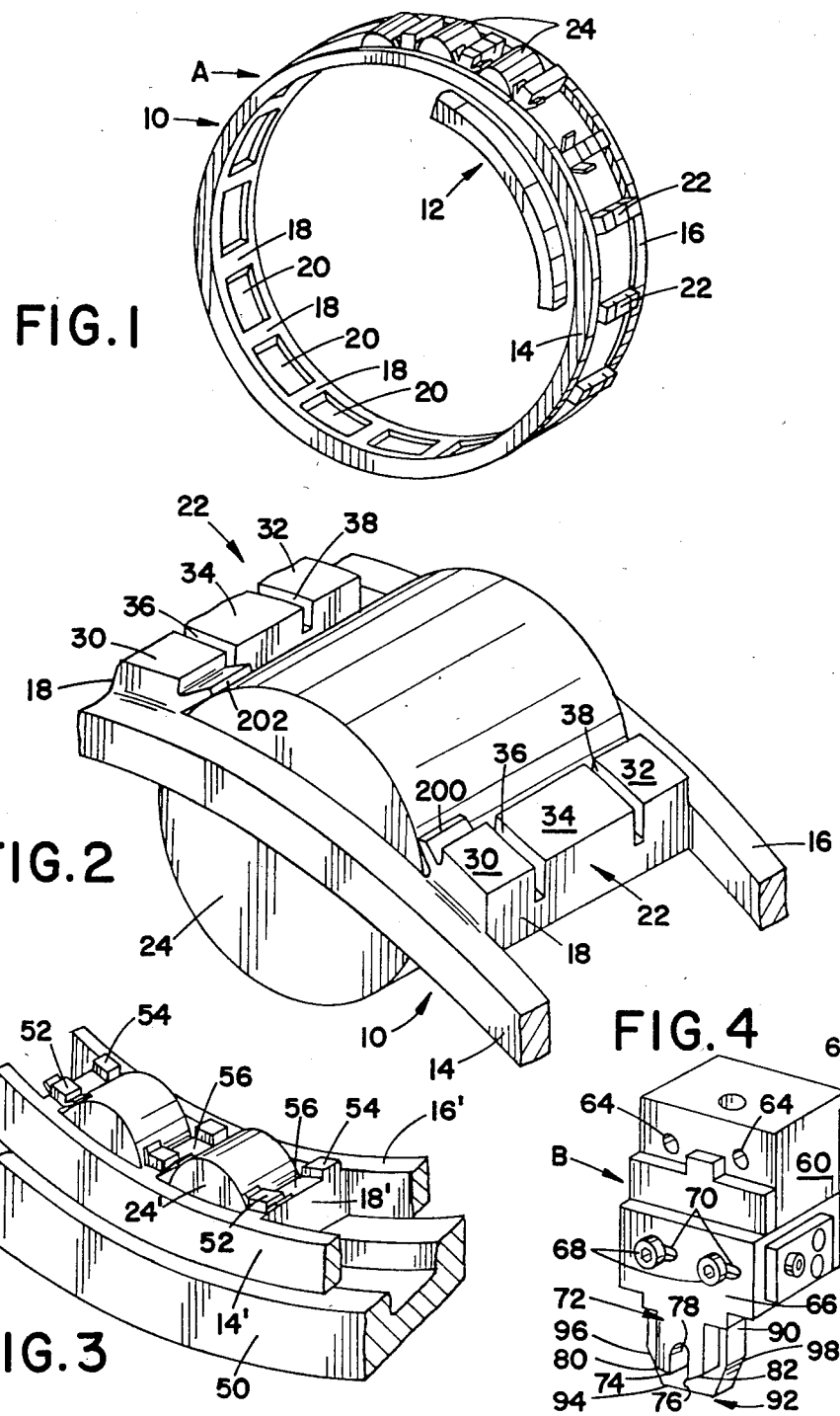

METHOD FOR FORMING ROLLER RETAINERS IN A BEARING CAGE

BACKGROUND OF THE INVENTION

This invention pertains to the art of bearings and, more particularly, to roller type bearings.

The invention is particularly applicable to method and apparatus for retaining rollers in a bearing cage and will be described with particular reference thereto. However, it will be appreciated that the invention may be adapted for use in other applications and environments.

Typical roller bearings include a pair of coaxially disposed annular bearing races, i.e., inner and outer races, having a bearing cage interposed therebetween. The bearing cage includes a plurality of roller receiving pockets at spaced intervals circumferentially therearound with the pockets, in turn, being spaced apart from each by bearing cage webs. The bearing cage functions to retain the rollers in a spaced relation to each other and to prevent roller skewing or misalignment. In most roller bearing constructions, means are also provided for retaining the individual rollers in their associated or respective roller receiving pockets in the bearing cage.

One type of retaining means previously employed involved use of lug members integral with the bearing cage webs. These lugs were notched longitudinally of the webs, i.e., laterally of the cage, and then formed to overlie portions of the adjacent roller receiving pockets in a retaining relationship relative to the rollers. While such arrangements have proved generally satisfactory for roller retaining purposes, they have necessarily involved manufacturing steps which are more expensive and time consuming to perform than is considered desirable. Such steps include broaching and grinding which require sophisticated and expensive processing machinery. Manufacturing steps of the foregoing type thus added to the overall bearing costs.

Accordingly, it has been considered desirable to develop a new method and apparatus for forming roller retainers in a bearing cage which would overcome the foregoing difficulties. The subject invention is considered to meet these needs and provide method and apparatus which are simple in design, economical to utilize, versatile for accommodating use in different types of roller bearing designs, and readily adapted to use in many varied applications and/or environments.

BRIEF DESCRIPTION OF THE INVENTION

The present invention provides a method for retaining cylindrical rollers in receiving pockets defined in a roller bearing cage. The cage includes a plurality of laterally spaced apart webs defining side walls for the receiving pockets. These webs, in turn, include protrusions or lugs extending outwardly therefrom in a direction generally normal to the plane of the cage and which terminate in protrusion outer faces. The method itself comprises the steps of performing a staking operation inwardly into a protrusion from the protrusion outer face at an area thereof generally parallel to the adjacent receiving pocket side wall; and, continuing the step of performing to some predetermined depth in the protrusion for causing a portion of each protrusion to be formed into a desired shape overlying the adjacent receiving pocket in a retaining relationship relative to a roller disposed therein.

According to another aspect of the invention, the method includes the step of providing a staking tool having a predetermined conformation at a tool working end to effect the step of performing. The tool working end causes the protrusion portion to be moved toward a predetermined generally arcuate shape transversely of the associated web during the step of continuing.

According to another aspect of the invention, the step of performing is carried out by means of a staking tool and the method further includes positively locating the tool relative to the protrusion at least immediately prior to the step of performing.

In accordance with one specific application of the method, the step of performing includes generally simultaneous staking of a pair of protrusions disposed on adjacent bearing cage webs which define the opposite side walls of a receiving pocket. The step of continuing causes at least a portion of each protrusion to be formed toward each other for overlying portions of the same receiving pocket. According to another application, the step of performing includes generally simultaneous staking at two locations on a single protrusion so that laterally spaced apart portions thereof are working in opposite directions for overlaying portions of the adjacent receiving pockets.

According to another aspect of the invention, apparatus is provided for staking protrusions on roller bearing cage webs to retain the rollers in receiving pockets defined between adjacent ones of the webs. The apparatus includes a punch having a first end which includes means for staking the protrusions in a predetermined manner to a preselected conformation. Means are included for supporting the bearing cage in a desired orientation relative to the punch and moving means selectively move the punch and support means relative to each other between first normal and second operative positions. In the first position, the punch and support means are spaced apart from each other and in the second position, the punch first end performs a predetermined staking operation to at least one web protrusion on the bearing cage. Adjusting means accommodates selective adjustment of the distance between the first and second positions. Also provided is locating means for precisely locating the punch first end relative to a web protrusion as the punch and support means are moved from the first toward the second position.

Also in accordance with the subject invention, a staking punch assembly is provided which is particularly adapted for staking lugs on bearing cage webs into retaining positions with rollers disposed in adjacent roller receiving pockets. This assembly includes a punch body having means adapted to be fixedly secured to associated apparatus. A staking punch has a mounting end secured to the die body and a staking end spaced some predetermined distance from the body. The staking end has a predetermined configuration adapted to be brought into staking engagement with a bearing cage lug to work a portion of the lug into some preselected roller retaining condition. A locator bar is movably mounted to the punch body closely adjacent the staking punch and includes a locator end having a predetermined configuration adapted to be brought into locating engagement with selected portions of a bearing cage for locating web lugs relative to the staking punch. The locator end has a first normal position axially outward of the punch staking end and a second locating position spaced toward the punch body from the first position. Biasing means continuously exert a biasing force against the locator bar for urging it toward the first position.

The principal object of the present invention is the provision of method and apparatus for forming bearing cage roller retainers.

Another object of the invention is the provision of such method and apparatus which are simple in design and easy to implement into practical application.

A further object of the invention is the provision of method and apparatus which are cost effective, reliable, and which are readily adapted to use for forming bearing cage roller retainers in a wide variety of specific roller bearing designs.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, preferred and alternative embodiments which will be described in detail in this specification and illustrated in the accompanying drawings which form a part hereof and wherein:

FIG. 1 is a partial perspective view of a roller bearing with a bearing cage which accommodates practicing of the subject new method thereon;

FIG. 2 is an enlarged view of a portion of the arrangement shown in FIG. 1;

FIG. 3 is a partial perspective view of a roller bearing with a bearing cage showing an alternative form of practicing the new method;

FIG. 4 is a perspective view showing a punch assembly utilized in practicing the concept of the invention;

DETAILED DESCRIPTION OF THE PREFERRED AND ALTERNATIVE EMBODIMENTS

Figure 5:
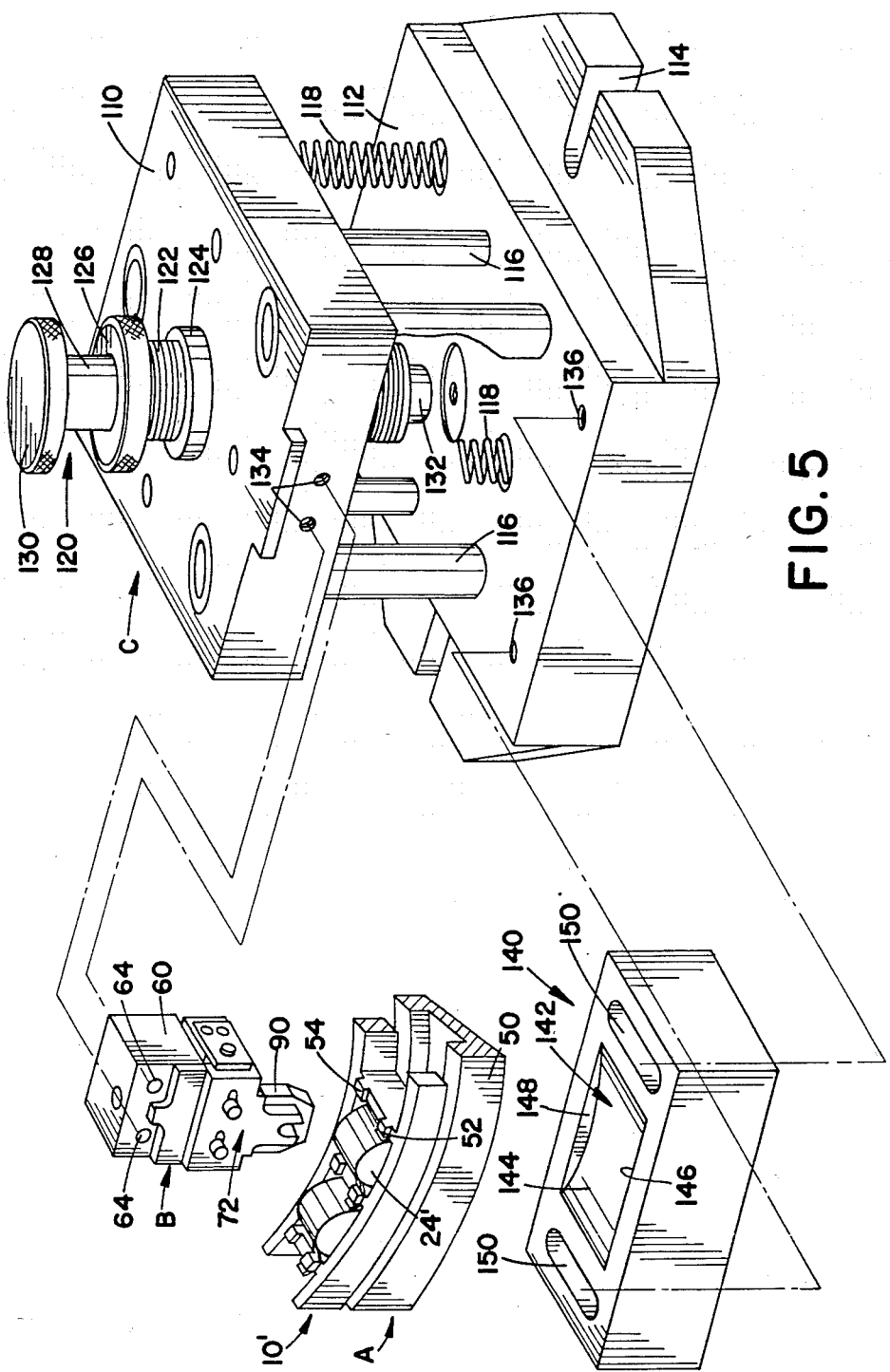
FIG. 5 is an exploded perspective view of apparatus utilized in practicing the invention.

Referring now the drawings wherein the showings are for purposes of illustrating preferred and alternative embodiments of the invention only, and not for purposes of limiting same, FIGS. 1 and 2 show a roller type bearing A which accommodates practice of the subject new method thereon.

More particularly, FIGS. 1 and 2 show roller bearing A as having a generally cylindrical bearing cage 10 and a conventional cylindrical inner race 12. As is known, the rollers are retained in a desired orientation and laterally spaced relationship circumferentially of the bearing cage in rolling engagement with a trough in the inner race. In many cases, and as is known, the final construction for roller bearing A will also include an outer race (not shown).

Bearing cage 10 includes a pair of laterally spaced apart circular or cylindrical end rings or flanges 14,16 having a plurality of webs 18 extending laterally therebetween. The webs are positioned at predetermined intervals around the race to define, in combination with the end flanges, a plurality of roller receiving pockets 20. Webs 18 define the pocket side walls for the pockets with end rings 14,16 thus defining the end walls. Protrusions or lugs 22 extend radially outward of webs 18. These protrusions generally comprise extensions of the webs themselves outwardly beyond the outer periphery of end rings 14,16. Cylindrical rollers 24 are received in pockets 20 as is shown in both FIGS. 1 and 2. The concept of providing protrusions or lugs 22 is already broadly known in the art for purposes of providing roller retaining means. Heretofore, however, such lugs have necessarily required expensive and time-consuming broaching and/or grinding operations in order to form the lugs into desired roller retaining positions.

With regard to the subject invention, and with continued reference to both FIGS. 1 and 2, lugs 22 each comprise a pair of retainer forming portions 30,32 disposed on each side of a central locating portion 34. A pair of slots 36,38 extending circumferentially of the cage separate locating portion 34 from retainer portions 30,32. As will be noted, slots 36,38 extend inwardly into the lugs from the outer face thereof to a depth generally coextensive with the outside diameter of race end rings 14,16.

FIG. 3 shows an alternative arrangement which facilitates practicing the subject method wherein the protrusions or lugs extend radially inward of the bearing race. For ease of illustration and appreciation of this alternative, like components are identified by like numerals with a primed (′) suffix and new components are identified by new numerals.

Specifically, the cylindrical roller bearing A′ shown in FIG. 3 includes a bearing cage 10′ and a conventional, outer bearing race 50. In this arrangement, however, the web protrusions or lugs are defined by a pair of radially inward extending lugs 52,54 on each of webs 18′. These lugs also comprise extensions of the webs themselves and define a channel-like area 56 therebetween. It should be appreciated that the web protrusion arrangement of FIGS. 1 and 2 and the arrangement of FIG. 3 are interchangeable so that they are usable in either the "external" arrangement of FIGS. 1 and 2 or the "internal" arrangement of FIG. 3.

FIG. 4 shows a punch assembly B which is advantageously utilized in practicing the subject invention in conjunction with bearing A′ of FIG. 3. In particular, the punch assembly includes a punch assembly body generally designated 60 having a planar rear or mounting face 62. A pair of mounting openings 64 extend through body 60 between the forward face and rear face 62 and are utilized to fixedly secure the assembly to apparatus in a manner to be described. A staking punch generally designated 66 depends from body 60 in a plane substantially parallel to the plane of body rear face 62. Conventional threaded fasteners 68 passing through slots 70 fixedly secure this staking punch to body 60. Slots 70 extend laterally of the punch longitudinal dimension to accommodate selective lateral adjustment of the punch relative to the body.

Punch 66 includes an outer working or staking end 72 having a predetermined conformation to facilitate obtaining a desired staking action. As shown, working or staking end 72 includes a pair of parallel staking edges 74,76 spaced apart from each other by a groove-like relief area 78. Tapered lands 80,82 extend away from edges 74,76 respectively, in opposite directions to each other. Also, each land tapers upwardly toward the punch body at some preselected angle or rate for obtaining a particular retaining means conformation in that portion of each protrusion which is to be worked. The various spacial relationships involved will become more readily apparent hereinafter.

A locating bar generally designated 90 is mounted to punch assembly body 60 immediately adjacent staking punch 66 so as to extend generally coextensive therewith. However, locating bar 90 is movably mounted relative to the assembly body in order that it may be selectively moved from a first or normal position to a second or retracted position disposed axially or longitudinally of itself back toward body 60. The locator bar includes a locator end generally designated 92 comprised of a flat 94 and a pair of opposed tapered roller contact areas 96,98. Flat 94 is adapted to engage a bearing cage web and contact areas 96,98 are adapted to engage the rollers in those receiving pockets adjacent the web in a manner and for purposes to be described. As shown in FIG. 4, locator bar 90 is in its first or normal position wherein flat 94 and contact areas 96,98 are spaced outwardly of staking punch working or staking end 72. Convenient spring biasing means (not shown) in body 60 cooperatively engage the upper end of locating bar 90 to continuously urge it toward the first position shown. However, the biasing force of the spring is overcome during punch assembly use for allowing forced retraction of the bar toward and into body 60.

FIG. 5 shows one apparatus or mechanism C which may be utilized with punch assembly B of FIG. 4 for processing cylindrical roller bearing A' of FIG. 3. More particularly, apparatus or mechanism C is comprised of an upper die half 110 and a lower die half 112 of conventional or known types. The lower die half includes conveniently located tie down slots 114 which accommodate rigid affixing of the die half to an appropriate press bed or other rigid structure. A plurality of guide pins 116 communicate between the upper and lower die halves for purposes of precisely guiding the halves toward and away from each other during operation as is conventional. A plurality of die springs 118 are strategically located between halves 110,112 for purposes of cushioning the halves as they are brought toward close communication with each other and for thereafter urging them apart from each other.

In operation, one of the die halves is moved toward and away from the other die half during a normal operating cycle. The distance or amount of movement of the one die half comprises the die stroke and it is usually considered desirable to provide means to facilitate stroke adjustment for accommodating various alternative applications.

To that end, apparatus C includes an adjustment assembly generally designated 120. As shown, this assembly is comprised of a threaded outer collar or tube 122 threadedly received by a bushing 124 disposed in fixed communication with upper die half 110. Outer collar or tube 122 penetrates the upper die half and extends downwardly toward the lower die half. An adjusting flange 126 is conveniently affixed to the outer collar adjacent the upper end thereof to accommodate selective collar or tube rotation for adjustment purposes. An elongated inner shaft 128 is threadedly received in and through the outer collar and includes a separate adjusting flange 130. In the arrangement shown, threaded cooperation between collar 122 and bushing 124 is with a somewhat coarse thread to provide a course adjustment feature. The threaded relationship between shaft 128 and the interior of collar 122 is with a finer thread to thereby provide a fine adjustment feature.

The arrangement shown in FIG. 5 comprises a positive stop die set. The length of the stroke from an uppermost or normal position thus is determined by the length or amount of insertion of inner shaft 128 through upper die half 110. The outermost or lower end 132 of the shaft defines a stop for positively engaging lower die half 112 during apparatus operation. Adjustment of threaded inner shaft 128 relative to upper die half 110 thereby permits the die set stroke to be altered as necessary and/or appropriate to accommodate specific processing details or requirements.

The forward side edge of the upper die half includes a pair of spaced apart threaded punch assembly mounting openings 134. These openings receive threaded fasteners passing through openings 64 in punch assembly body 60 for fixedly securing the assembly to the upper die half. The upper or top face of the lower die half includes a pair of spaced apart threaded anvil or support means mounting openings 136.

Continuing with reference to FIG. 5, and for purposes of supporting bearing A', an anvil or support means 140 is advantageously provided. This support means includes a receiving cavity 142 for closely receiving a segment of outer bearing race 50 directly opposite the working area of punch assembly B. This receiving cavity includes an arcuate bottom wall 144 substantially compatible with the outer periphery of race 50 and a pair of side walls 146,148 which are spaced apart to receive and retain the race in a desired orientation relative to the punch assembly. A pair of elongated mounting slots 150 which mate with openings 136 allow the anvil to be fixedly secured to the lower die half by means of conventional threaded fasteners. In addition, slots 150 accommodate selective anvil adjustment for properly positioning bearing A' relative to punch assembly B.

Figure 6:
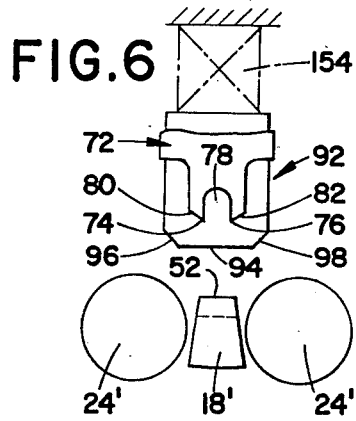
FIGS. 6, 7, and 8 are schematic side elevational views showing the basic steps utilized in practicing the subject new method; and, FIG. 9 is a partial perspective view showing an alternative punch assembly and support means used for practicing the invention.
Figure 7:
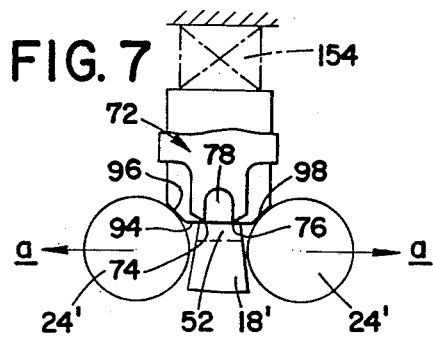
Figure 8:
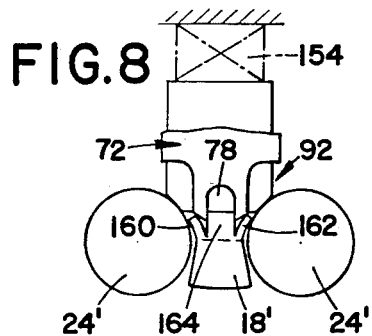

FIGS. 6, 7, and 8 schematically show the subject new method as practiced in conjunction with roller bearing A' of FIG. 3, punch assembly B of FIG. 4, and apparatus C of FIG. 5. More particularly, FIG. 6 shows one of lugs 52 disposed directly beneath punch working or staking end 72 when the associated roller bearing has been positioned in the receiving cavity of the anvil or support means. As will be noted, locator end 92 of the locator bar extends outwardly of punch working or staking end 72 and is urged to this position by spring biasing means generally designated 154. As previously noted, this spring biasing means is disposed in the punch assembly body and operates against the inner end of the locating bar.

FIG. 7 shows the general arrangement and relationship of components when the upper die half has been moved toward the lower die half for bringing the punch assembly into working contact with lug 52. As shown, flat 94 of the locator end has engaged the top or uppermost surface of lug channel 56 (FIG. 3) and roller contact areas 96,98 are in engagement with the adjacent rollers 24' in the immediately adjacent roller receiving pockets. Tapered contact areas 96,98 urge the rollers in opposite directions a into positive physical engagement with the next adjacent bearing cage webs, i.e., the opposite side walls of their respective receiving pockets. Due to preselected dimensional relationships which are involved, any minor or slight misalignment between lug 52 and punch working or staking end 72 will automatically be corrected by the cooperative interaction between the roller contact areas 96,98 and rollers 24'.

As the punch assembly continues in a downward direction, the locator bar remains stationary relative to the bearing cage and is retracted into the punch assembly body against the opposite force of spring biasing means 154. As will also be seen, staking edges 74,76 have reached a position of working engagement with the top surface of lug 52. It will be here appreciated that the staking edges are spaced apart from each other across relief area 78 by some predetermined amount as a function of the thickness of lug 52 and the desired thickness of those roller retaining means or fingers which are to be formed therefrom.

FIG. 8 shows the punch assembly as it has continued its downward movement well into working engagement with lug 52. The staking edges have penetrated the lug from its top surface and tapered lands 80,82 are directing portions of the lug toward a partially overlying relationship with the receiving pockets of the adjacent rollers 24' for purposes of defining roller retaining means or fingers 160,162. Central portion 164 of the lug is received within relief area 78 between the staking edges. The tapered or other suitable conformation of lands 80,82 thus functions to define the particular shape of roller retaining means 160,162 which is ultimately obtained.

As the forming step shown in FIG. 8 is completed to some desired depth within the lug, the upper die half bottom out on the lower die half as by means of the adjustment assembly. Thereafter, the upper die half is moved back to its original position as shown in FIG. 6 to accommodate re-positioning of roller bearing A' for purposes of staking the next adjacent lug. This operation is repeated until all the lugs on the roller bearing have been processed.

As best shown in FIG. 3, each roller 24' is retained in its associated receiving pocket by retaining means or fingers extending from the associated receiving pocket side walls, i.e., from cage webs 18'. In FIG. 3, only lugs 52 have been shown as being processed with lugs 54 still appearing in their original condition. Lugs 54 may be processed in a manner and fashion substantially identical to that hereinabove described. It would also be possible, however, to modify punch assembly B for processing lugs 52,54 on each web simultaneously. Race 50 retains rollers 24' in their receiving pockets on the outside of bearing cage 10' and retaining fingers 160,162 formed from the web protrusions retain the rollers in the receiving pockets on the inside of the bearing race. The retaining fingers are advantageously formed so that they do not in any way interfere with free rotation of rollers 24' during bearing use.

Figure 9:
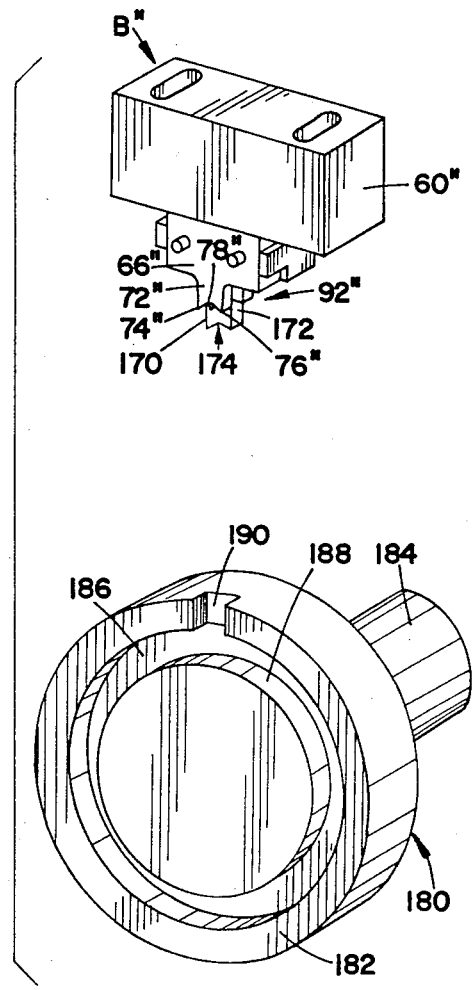

FIG. 9 shows a slightly modified punch and anvil arrangement for forming the lugs on the bearing construction shown in FIGS. 1 and 2. Here, for ease of illustration and appreciation of the modifications, like components are identified by like numerals with a double primed ('') suffix and new components are identified by new numerals.

In the construction of punch assembly B'', working or staking end 72'' of staking punch 66'' has a slightly different conformation. Specifically, staking edges 74'',76'' are spaced apart from each other in order to work or stake portions of protrusions or lugs on a pair of adjacent cage webs, i.e., to simultaneously form roller retaining means or fingers at both side walls of a bearing cage roller retaining pocket. As shown, relief area 78'' is thus defined by a pair of inwardly and upwardly tapering lands. These lands are configured so as to cause portions of the protrusions being worked to be moved into the desired roller retaining position in a manner similar to that previously described.

Locator end 92'' of the locator bar also has a slightly different conformation and is dimensioned so that the outer side edges thereof define gaging surfaces 170,172. An arcuate relief area 174 extends inwardly into the locating bar from locator end 92''. This relief area is dimensioned to span the roller interposed between the two adjacent bearing cage webs which are to be worked.

In the FIG. 9 arrangement, the anvil or bearing support means is generally designated 180 and includes a cylindrical body 182 having a mounting shaft 184 extending outwardly from the rear face thereof adapted to be mountingly received by a lower die half. An annular groove 186 extends inwardly into the forward end face of body 182 to define a bearing receiving cavity. Inner circumferential surface 188 of this annular groove is dimensioned to support the inner race of a roller bearing which is to be processed. A radially extending access groove 190 communicates between the outer periphery of body 182 and groove 186 for allowing penetration of the staking punch and locator during bearing cage processing.

In using the foregoing alternative arrangement in processing a roller bearing construction of the type shown in FIGS. 1 and 2, a process similar to that previously described with reference to FIGS. 6, 7, and 8 is involved. Here, however, two adjacent protrusions, i.e., the protrusions on each side of a roller receiving pocket, are simultaneously worked. As the punch assembly is cycled, locator end 92'' spans one of rollers 24 for precisely positioning the bearing cage relative to the remainder of the punch assembly. Further downward movement of locator end 92'' causes gaging surfaces 170,172 to gage against the side walls of the protrusions which face that particular roller member. In the case of the bearing race shown in FIG. 2, such gaging is effected against central locating portions 34 on each of the two cage webs 18 shown therein.

Continuation of the processing cycle thereafter causes staking edges 74,76 to engage the top surface of protrusion worked portions 30 of these same two cage webs to perform a staking operation. Sections of protrusion worked portions 30 are formed and moved into a retaining means or finger relationships with roller 24 by means of the tapered lands which define relief area 78'' on the staking punch. These retaining fingers are designated by numerals 200,202 in FIG. 2.

The foregoing process is then repeated for each of rollers 24 in the bearing cage. Thus, worked portions 30 of the protrusion on each of bearing cage webs 18 is staked at the opposite sides thereof in separate processing steps for purposes of defining the roller retaining means. Thereafter, the apparatus employed may be adjusted for purposes of similarly staking protrusion worked portions 32 which are disposed on the other side of central locating portions 34 from worked portions 30. However, it would be possible to construct punch assembly B'' and anvil or support means 180 to accommodate simultaneous processing of worked portions 30,32.

It will be appreciated that the foregoing method and apparatus specifically described with reference to FIGS. 1–9 may be modified as deemed necessary and- /or appropriate to accommodate particular bearing constructions and/or processing requirements. For example, details of punch assemblies B,B", apparatus C, and anvils 140,180 may be modified as necessary to facilitate processing of particular roller bearing types and constructions. Such modifications do not, however, in any way depart from the overall intent or scope of the invention. Moreover, the two arrangements described are interchangeable insofar as their use on internal or external lug staking is concerned.

The invention has been described with reference to preferred and alternative embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A method for retaining roller members in a bearing cage wherein said cage includes a bearing cage plane and a plurality of roller receiving pockets disposed in a predetermined relationship relative to each other, and a roller disposed in each of said roller receiving pockets, said cage further including a plurality of web portions defining receiving pocket walls, said method comprising the steps of:
   (a) providing at least one lug on each web portion, said lug protruding outwardly from said web portion in a direction generally normal to said cage plane;
   (b) positioning said cage so that the lug on at least one web is disposed in operative relation to a staking punch having a predetermined conformation;
   (c) moving the lug on said one web and said at least punch into cooperative communication with each other;
   (d) precisely locating the lug on said one web relative to said punch by engaging a roller disposed in a roller receiving pocket positioned adjacent said one web with a locator bar associated with said punch
   (e) urging the roller disposed in the roller receiving pocket into physical contact with an adjacent web portion of the roller receiving pocket by use of a tapered contact area associated with the locator bar;
   (f) continuing said step of moving with said punch engaging said lug for imparting a staking action thereto so that a portion of said lug is worked to a preselected position overlaying at least a portion of said adjacent roller receiving pocket in a capturing relationship with said roller disposed in said adjacent receiving pocket;
   (g) causing said locator bar to be retracted relative to said punch during said step of continuing; and,
   (h) subsequently retracting said punch and said lug from cooperative communication with each other.

2. The method as defined in claim 1 further including repeating the steps of positioning, moving urging, continuing, and retracting for staking lugs on other webs in said cage.

3. The method as defined in claim 1 wherein said step of moving is performed in a direction generally normal to said cage plate at an area of said at least one web.

4. The method as defined in claim 1 wherein said cage pockets are disposed in a laterally spaced apart relationship in said cage with a web being interposed between adjacent ones of said pockets, said method including the step of configuring said punch for performing a pair of staking actions during said step of continuing for causing a pair of lug portions to be worked into selected positions overlaying portions of the adjacent roller receiving pockets.

5. A method for retaining cylindrical rollers in receiving pockets defined in a roller bearing cage wherein a plurality of laterally spaced apart webs define side walls for said receiving pockets and include protrusions extending outwardly therefrom normal to adjacent receiving pockets and terminating in protrusion outer faces, and a roller positioned in each of said roller receiving pockets, said method comprising the steps of:
   (a) providing a staking tool having a predetermined conformation at a tool working end;
   (b) providing a locator bar adjacent to and generally coextensive with said staking tool, said locator bar having a tapered contact area and being resiliently biased such that a free end thereof extends past said tool working end of said staking tool;
   (c) precisely locating said staking tool and at least one of said protrusions relative to each other by having of said tapered contact area of said locator bar gage against a roller in a receiving pocket immediately adjacent said protrusion and a further portion of said bar gage against an area of said roller bearing cage spaced from a protrusion portion which is to be worked;
   (d) performing a staking operation inwardly into said one protrusion from an outer face at an area thereof generally parallel to the receiving pocket side walls;
   (e) retaining said locator bar in stationary gaging relation against said roller bearing cage during said step of performing a staking operation;
   (f) causing said locator bar to be retracted relative to said staking tool during said step of performing a staking operation such that said tool working end of said staking tool extends past said locator bar free end; and,
   (g) continuing said step of performing a staking operation to a preselected depth for working said portion of the protrusion into a retaining finger which overlays at least a portion of an adjacent receiving pocket in a retaining relationship with a roller disposed therein.

6. The method as defined in claim 5 including the step of configuring said staking tool for having a predetermined conformation at the tool working end for causing said protrusion portion to be worked toward a predetermined generally arcuate shape transversely from an associated web during said step of continuing.

7. The method as defined in claim 5 wherein said step of performing a staking operation includes generally simultaneous staking of a pair of protrusions disposed on adjacent cage webs which define opposite side walls of a receiving pocket, said step of continuing causing at least a portion of each protrusion to be worked in opposite directions toward each other overlaying areas of one receiving pocket in a retaining relationship with the roller disposed therein.

8. The method as defined in claim 5 wherein said step of performing a staking operation includes generally simultaneous staking of a protrusion so that laterally spaced apart portions thereof are worked in opposite directions away from each other overlying areas of the adjacent receiving pockets in retaining relationships with the rollers disposed therein.

* * * * *